(12) United States Patent
Laumeier et al.

(10) Patent No.: US 10,500,985 B2
(45) Date of Patent: Dec. 10, 2019

(54) TRACK RELEASE MECHANISM BEARING

(71) Applicant: Lear Corporation, Southfield, MI (US)

(72) Inventors: Marc Laumeier, Langenberg-Benteler (DE); Klaus Walter, Panderborn (DE); Michael Wojatzki, Ennigerloh (DE)

(73) Assignee: Lear Corporation, Southfield, MI (US)

( * ) Notice: Subject to any disclaimer, the term of this patent is extended or adjusted under 35 U.S.C. 154(b) by 69 days.

(21) Appl. No.: 15/592,640

(22) Filed: May 11, 2017

(65) Prior Publication Data

US 2018/0079324 A1 Mar. 22, 2018

(30) Foreign Application Priority Data

Sep. 22, 2016 (DE) .................. 10 2016 218 236

(51) Int. Cl.
| | |
|---|---|
| *B60N 2/07* | (2006.01) |
| *F16C 17/12* | (2006.01) |
| *B60N 2/68* | (2006.01) |
| *B60N 2/08* | (2006.01) |

(52) U.S. Cl.
CPC ......... *B60N 2/0722* (2013.01); *B60N 2/0881* (2013.01); *B60N 2/682* (2013.01); *F16C 17/12* (2013.01); *B60N 2/0705* (2013.01)

(58) Field of Classification Search
USPC ....................................................... 248/429
See application file for complete search history.

(56) References Cited

U.S. PATENT DOCUMENTS

| | | | | |
|---|---|---|---|---|
| 5,167,393 A | * | 12/1992 | Hayakawa | B60N 2/0705 248/430 |
| 5,348,262 A | * | 9/1994 | Isomura | B60N 2/0232 248/419 |
| 5,848,775 A | * | 12/1998 | Isomura | B60N 2/067 248/430 |
| 6,109,584 A | | 8/2000 | Garrido | |
| 6,220,642 B1 | * | 4/2001 | Ito | B60N 2/0232 248/429 |
| 6,227,596 B1 | | 5/2001 | Foucault et al. | |

(Continued)

FOREIGN PATENT DOCUMENTS

| | | |
|---|---|---|
| DE | 202011102248 U1 | 8/2011 |
| DE | 102010055244 A1 | 6/2012 |

(Continued)

OTHER PUBLICATIONS

German Patent Office, Office Action, dated Jul. 31, 2017, 7 pages, Germany (English machine translation attached).

*Primary Examiner* — Monica E Millner
(74) *Attorney, Agent, or Firm* — Fishman Stewart PLLC

(57) ABSTRACT

A seat track assembly may include a first seat track, a second seat track that may configured to slide relative to the first seat track, a cross member, and/or a bearing that may connect the cross member to the second seat track. The bearing may include a plurality of feet engaged with a plurality of apertures of the second seat track. A first aperture of the plurality of apertures may be disposed in a first side of the second seat track and/or a second aperture of the plurality of apertures may be disposed in a second side of the second seat track. The first side may be disposed substantially perpendicularly to the second side. The plurality of feet may include a first foot, a second foot, a third foot, and/or a fourth foot.

18 Claims, 7 Drawing Sheets

(56) References Cited

U.S. PATENT DOCUMENTS

| | | | |
|---|---|---|---|
| 6,695,275 B2 | 2/2004 | Schuler et al. | |
| 7,300,091 B2 | 11/2007 | Nihonmatsu et al. | |
| 7,455,343 B2 * | 11/2008 | Endo | B60N 2/002 296/65.13 |
| 7,604,214 B2 | 10/2009 | Kojima et al. | |
| 7,669,825 B2 | 3/2010 | Sung | |
| 7,717,392 B2 * | 5/2010 | Sakakibara | B60N 2/0705 248/424 |
| 8,006,949 B2 | 8/2011 | Kojima et al. | |
| 8,245,994 B2 * | 8/2012 | Yamada | B60N 2/073 248/424 |
| 8,517,328 B2 | 8/2013 | Wieclawski et al. | |
| 8,763,975 B2 | 7/2014 | Garotte | |
| 9,211,815 B2 | 12/2015 | Ruess et al. | |
| 9,216,673 B2 * | 12/2015 | Braun | B60N 2/07 |
| 9,227,528 B2 * | 1/2016 | Yamada | B60N 2/0843 |
| 9,393,883 B2 * | 7/2016 | Wojatzki | B60N 2/0818 |
| 9,963,047 B2 * | 5/2018 | Nozue | B60N 2/0705 |
| 10,046,672 B2 * | 8/2018 | Kuroda | B60N 2/0722 |
| 2009/0314916 A1 * | 12/2009 | Kojima | B60N 2/0881 248/429 |
| 2010/0044542 A1 * | 2/2010 | Koga | B60N 2/067 248/429 |
| 2010/0264288 A1 * | 10/2010 | Thuleau | B60N 2/0232 248/429 |
| 2012/0205512 A1 * | 8/2012 | Fujishiro | B60N 2/0705 248/429 |
| 2015/0083882 A1 | 3/2015 | Stutika et al. | |
| 2017/0166090 A1 * | 6/2017 | Elsarelli | B60N 2/067 |
| 2018/0126875 A1 * | 5/2018 | Kume | B60N 2/0715 |

FOREIGN PATENT DOCUMENTS

| | | |
|---|---|---|
| DE | 102014219233 A1 | 4/2015 |
| DE | 202016100763 U1 | 3/2016 |

* cited by examiner

TRACK RELEASE MECHANISM BEARING

CROSS-REFERENCE TO RELATED APPLICATION

This application claims the benefit of German Patent Application No. 102016218236.6, filed Sep. 22, 2016, the disclosure of which is hereby incorporated herein by reference in its entirety.

TECHNICAL FIELD

The present disclosure generally relates to bearings that may be used, for example, in connection with vehicle seat tracks and/or assemblies.

BACKGROUND

Seat tracks may be used in a variety of applications, such as in vehicles. In some situation, seat tracks may be configured to allow for longitudinal movement of seats. Seat track assemblies may include an actuating mechanism that a user may actuate to unlock the seat tracks. Previous designs for connecting actuating mechanisms with the seat tracks may be relatively heavy, large, expensive, and/or may be limited to relatively few applications.

SUMMARY

An embodiment of the present disclosure includes a seat track assembly that may comprise a first seat track, a second seat track that may configured to slide relative to the first seat track, a cross member, and/or a bearing that may connect the cross member to the second seat track. The bearing may include a plurality of feet that may be engaged with a plurality of apertures of the second seat track. A first aperture of the plurality of apertures may be disposed in a first side of the second seat track and/or a second aperture of the plurality of apertures may be disposed in a second side of the second seat track. The first side may be disposed substantially perpendicularly to the second side. The plurality of feet may include a first foot, a second foot, a third foot, and/or a fourth foot. The first foot may include a first portion, a second portion, and/or a third portion. The first portion may be disposed substantially perpendicularly to a bottom of the body. The second portion may be disposed substantially perpendicularly to the bottom of the body. The first portion and the second portion are disposed substantially perpendicularly to each other. The third portion may be disposed at ends of the first portion and the second portion. The third portion may be disposed substantially parallel to the bottom of the body. The third foot and the fourth foot may be substantially L-shaped.

In embodiments, a bearing may include a retaining tab engaged with an retaining aperture of the second seat track. The plurality of apertures may include at least four apertures. The first foot and the second foot may be disposed in parallel relative to a longitudinal direction of the first seat track. The third foot and the fourth foot may be disposed parallel to the longitudinal direction of the first seat track and/or may be offset from the first foot and/or the second foot.

In embodiments, an assembly may include a third seat track, a fourth seat track that may be configured to slide relative to the third seat track, and/or may include a second bracket that may connect the cross member to the fourth seat track. The second bracket may include a plurality of feet that may be engaged with a plurality of apertures of the fourth seat track. In embodiments, the bearing may comprise plastic. The bearing may be single, integrated component.

In embodiments, a bearing may comprise a plastic body that my include a cross member receiving portion. The cross member receiving portion may include a bearing surface that may be configured to facilitate rotation of the cross member. The body may include a plurality of feet that may be configured to engage apertures of a movable track. The body, including the cross member receiving portion and the plurality of feet, may be formed as a single, unitary/integrated component (e.g., formed/extruded as a single/monolithic piece). The plurality of feet may include a first foot, a second foot, a third foot, and/or a fourth foot. The first foot and the second foot may be substantially identical. The third foot and the fourth foot may be different from the first foot and the second foot. The first foot may include a first portion, a second portion, and/or a third portion. The first portion may be disposed substantially perpendicularly to a bottom of the body. The second portion may be disposed substantially perpendicularly to the bottom of the body. The first portion and the second portion may be disposed substantially perpendicularly to each other. The third portion may be disposed at ends of the first portion and the second portion. The third portion may be disposed substantially parallel to the bottom of the body. The third foot and/or the fourth foot may be substantially L-shaped. The bearing may include a retaining tab that may be configured to engage an tab aperture of said movable track.

Various aspects of the present disclosure will become apparent to those skilled in the art from the following detailed description of the various embodiments, when read in light of the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications and equivalents, which may be included within the spirit and scope of the present disclosure as defined by the appended claims.

Figure 1:
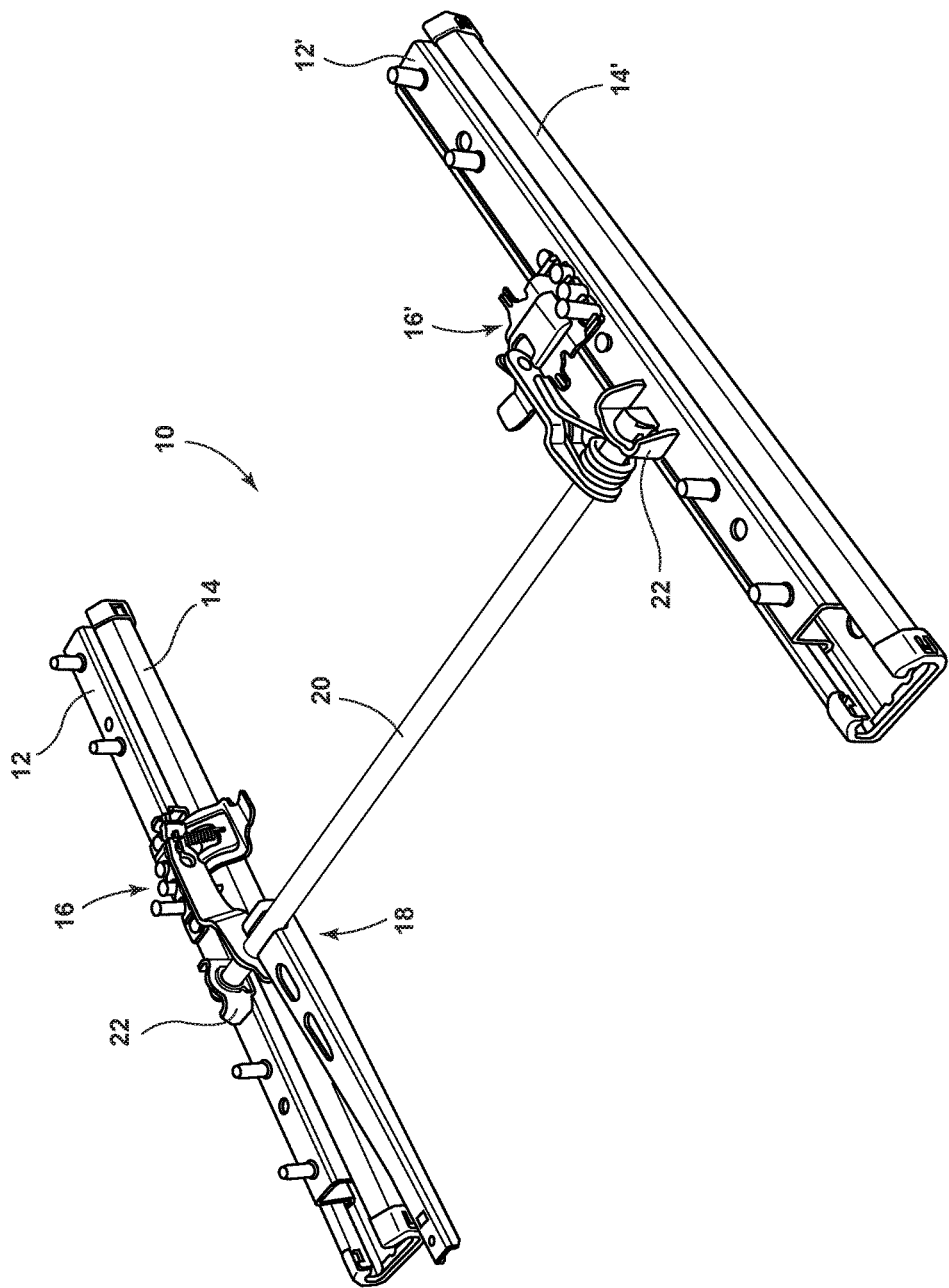
FIG. 1 is a perspective view generally illustrating a seat track assembly.
Figure 2B:
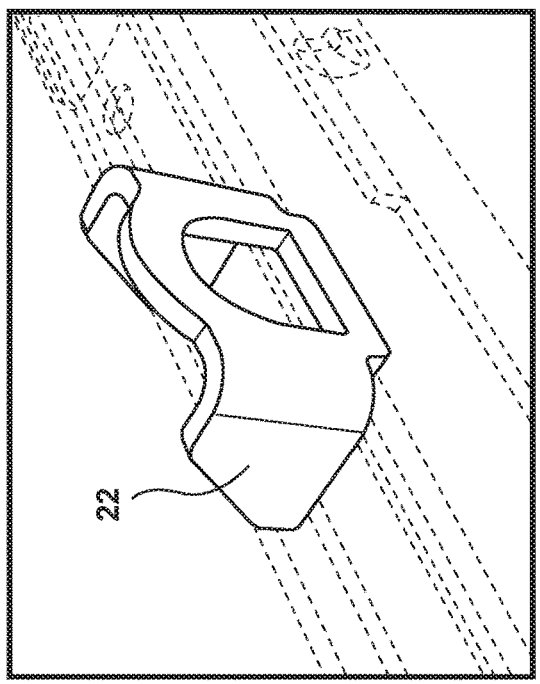
FIGS. 2A and 2B are perspective views generally illustrating portions of seat track assemblies.
Figure 2A:
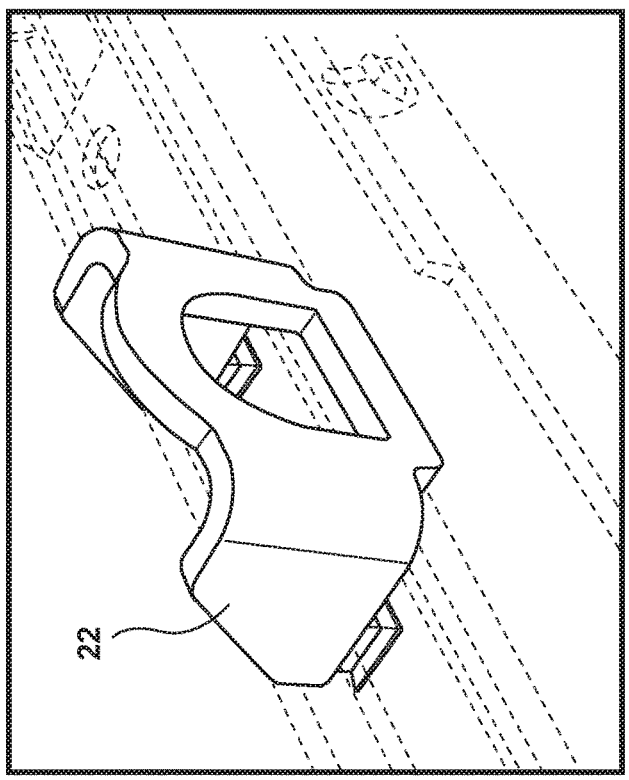
Figure 3:
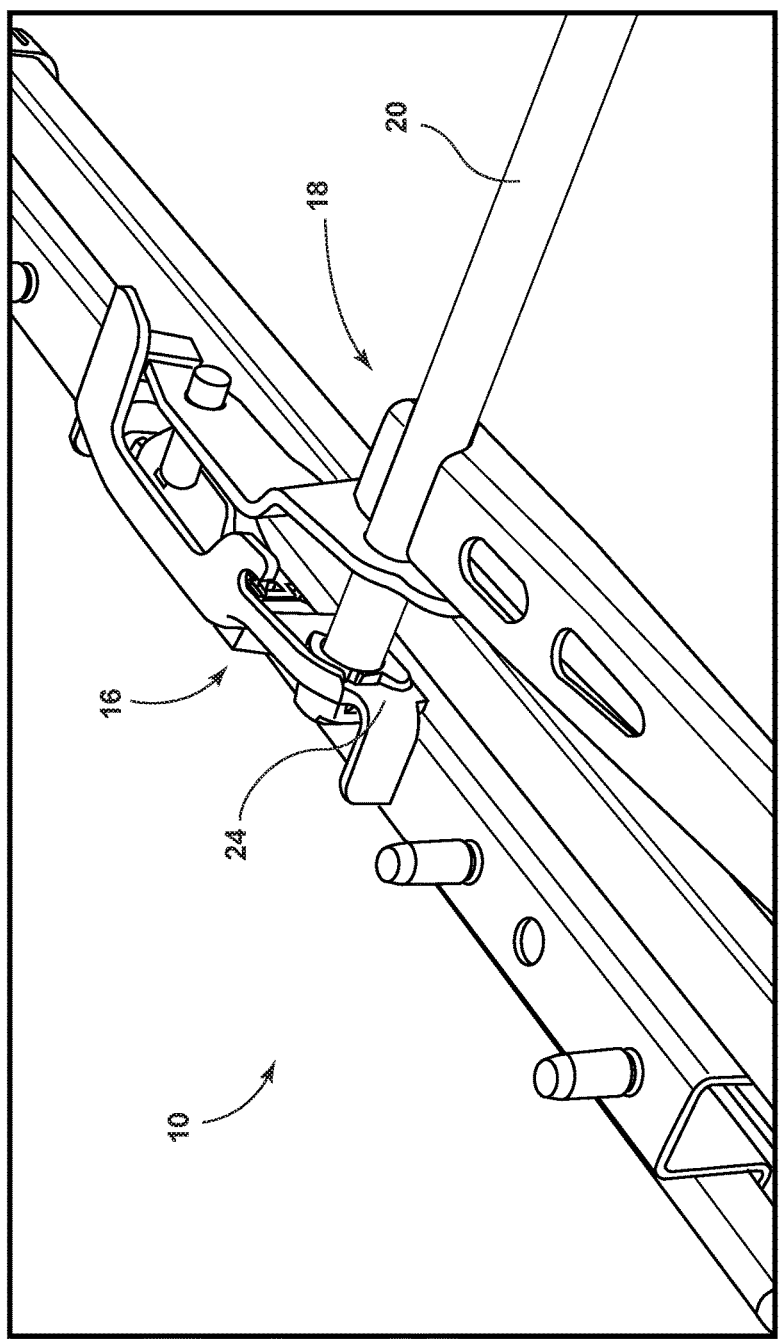
FIG. 3 is a perspective view generally illustrating portions of a seat track assembly.

In embodiments, such as generally illustrated in FIGS. 1, 2A, 2B, and 3, a seat track assembly 10 may include a two pairs of tracks that may each include a movable track 12, 12' and a fixed track 14, 14'. Each pair of tracks may include a locking mechanism 16, 16' that may selectively allow relative movement of the movable tracks 12, 12' relative to the fixed tracks 14, 14'. The locking mechanisms 16, 16' may be actuated via an actuating mechanism 18 that may include a cross member 20 connected to the movable tracks 12, 12' of both pairs of tracks. The cross member 20 may be connected with the movable tracks via a separate metal bracket 22 (see, e.g., FIGS. 1, 2A, and 2B) or a metal bracket integrated with the another component 24 (e.g., the locking mechanism, such as shown in FIG. 3).

Figure 4:
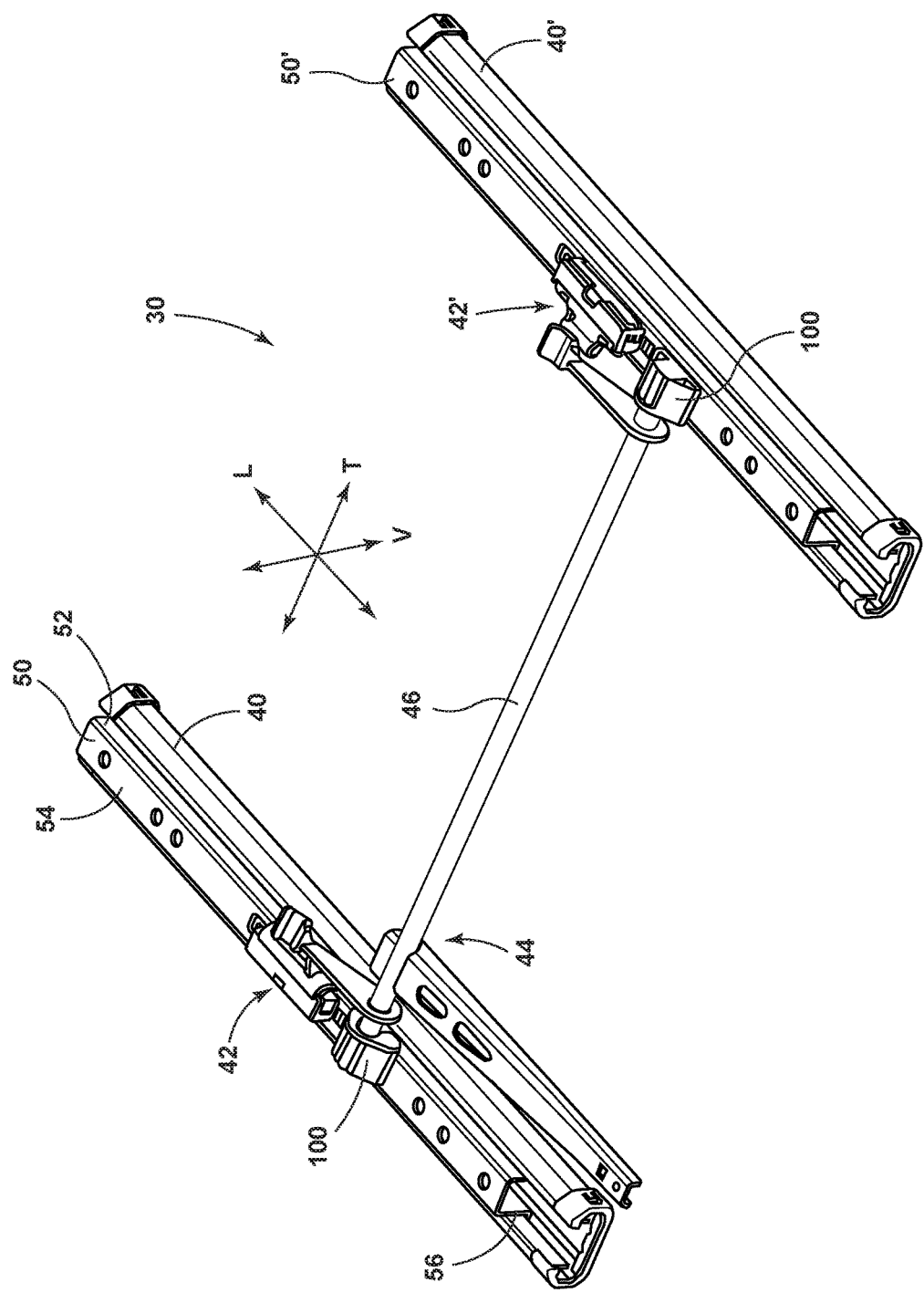
FIG. 4 is a perspective view generally illustrating portions of a seat track assembly in accordance with embodiments of the present disclosure.
Figure 5:
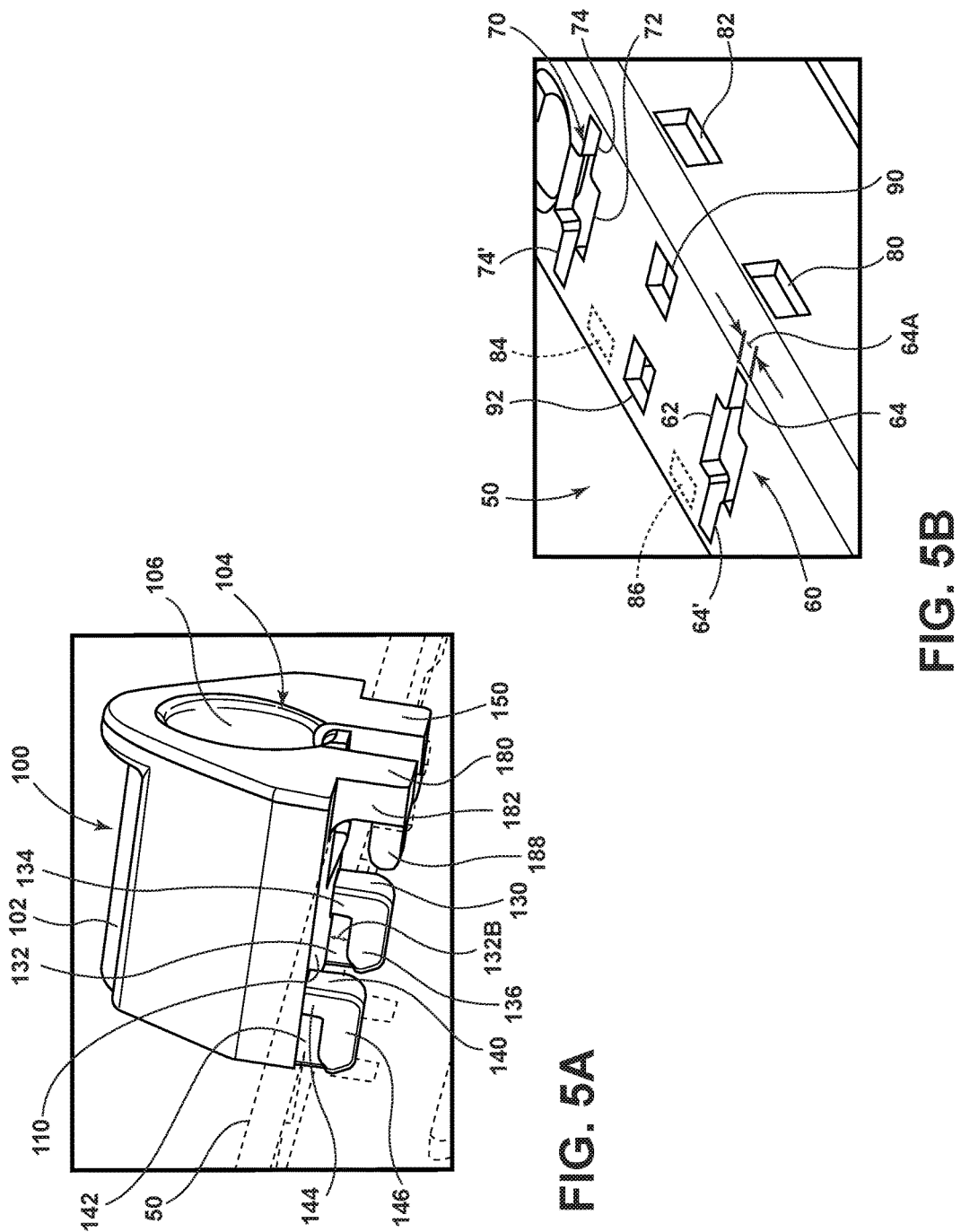
FIGS. 5A and 5B are perspective views generally illustrating portions of seat track assemblies in accordance with embodiments of the present disclosure.
Figure 6:
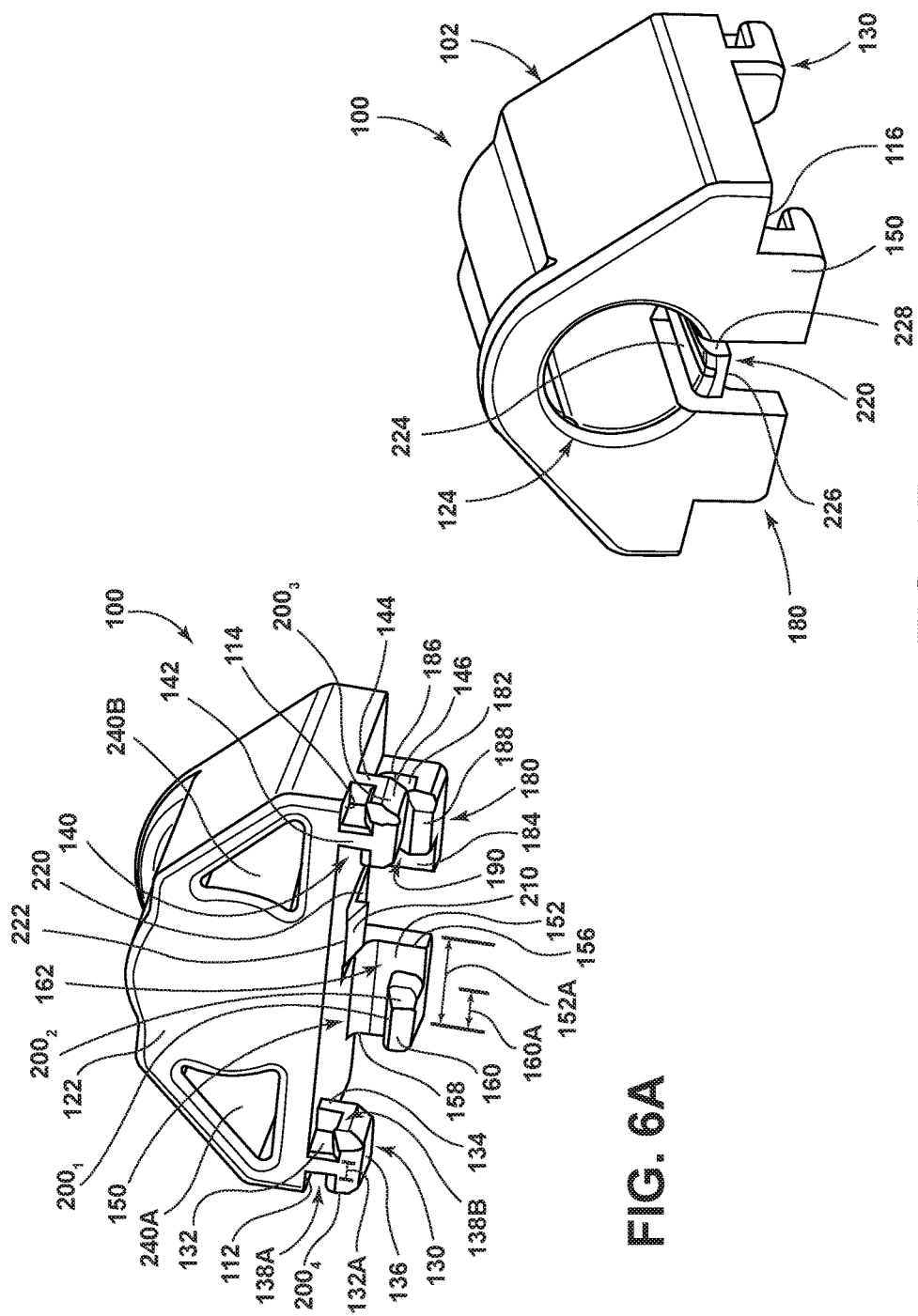
FIGS. 6A and 6B are perspective views generally illustrating portions of bearings in accordance with embodiments of the present disclosure.

With embodiments, such as generally illustrated in FIG. 4, a seat track assembly 30 may include a two pairs of tracks that may each include a fixed track 40, 40' and a movable track 50, 50'. Each pair of tracks may include a locking mechanism 42, 42' that may selectively allow relative movement of the movable tracks 50, 50' relative to the fixed tracks 40, 40'. The locking mechanisms 42, 42' may be actuated via an actuating mechanism 44 that may include a cross member 46 that may be connected to the movable tracks 50, 50' of both pairs of tracks. Cross member 46 may be connected with movable tracks 50, 50' via one or more bearings 100, 100'.

In embodiments, such as generally illustrated in FIGS. 5A, 6A, 6B, and 7, a bearing 100 may include one or more of a variety of shapes, sizes, configurations, and/or materials. For example, and without limitation, bearing 100 may include plastic and/or a polymer. Bearing 100 may include, in embodiments, a generally trapezoidal shape. With embodiments, bearing may be configured as a single, integrated, and/or unitary component.

In embodiments, bearing 100 may be configured to connect a cross member with another component, such as a movable track. Bearing 100 may include a body 102 that may include a cross member receiving portion 104. Cross member receiving portion 104 may be configured to receive at least a portion of a cross member (e.g., cross member 46) and/or may be configured to support cross member 46 for rotation. For example, cross member receiving portion 104 may include a bearing surface 106 upon which cross member 46 may be configured to rotate. Cross member receiving portion 104 may, for example, include a generally cylindrical configuration and/or bearing surface 106 may be provided at an inner diameter of cross member receiving portion 104.

With embodiments, such as generally illustrated in FIGS. 5A, 6A, and 6B, body 102 of bearing 100 may include one or more feet. Feet may be configured for connecting bearing to another component, such as a movable track (e.g., movable tracks 50, 50'). For example, and without limitation, feet may be configured to engage one or more apertures of a movable track.

In embodiments, feet may include a first foot 130, a second foot 140, a third foot 150, and/or a fourth foot 180. First foot 130 may include a first portion 132, a second portion 134, and/or a third portion 136. First portion 132, second portion 134, and/or third portion 136 may be generally planar. First portion 132 may extend outward and generally perpendicularly to a bottom surface 110 of body 102. Second portion 134 may extend outward and generally perpendicularly to bottom surface 110 of body 102. First portion 132 and second portion 134 may be disposed generally perpendicularly to each other and/or second portion 134 may substantially bisect first portion 132. Third portion 136 may be disposed generally parallel to bottom surface 110 of body 102, perpendicularly to first portion 132, and/or perpendicularly to second portion 134. Third portion 136 may be connected to body 102 via first portion 132 and/or second portion 134. First portion 132 may substantially bisect third portion 136. First portion 132, second portion 134, and/or third portion 136 may be disposed such that they define a first recess 138A and/or a second recess 138B. In embodiments, second foot 140 may be configured substantially the same as first foot 130 (e.g., may include a first portion 142, a second portion 144, and/or a third portion 146). First foot 130 may extend from at or about a first outer corner 112 of bottom surface 110 and/or second foot 140 may extend from at or about a second outer corner 114 of bottom surface 110. First foot 130 and second foot 140 may be aligned with each other in a longitudinal direction L. Body 102 may include an inner edge 116.

With embodiments, a movable track 50, 50' may include an aperture 60 that may be configured to receive first foot 130 and/or second foot 140. Aperture 60 may include a wide portion 62 and/or a narrow portion 64. Wide portion 62 and/or narrow portion 64 may, for example, include generally rectangular shapes. Wide portion 62 may be configured to receive all of first foot 130 or second foot 140 such that first foot 130 or second foot 140 may be inserted (e.g., vertically) into wide portion 62 until bottom surface 110 of body 102 contacts a top side 54 of movable track 50. Narrow portion 64 may be configured to receive at least some of first portions 132, 142. For example, and without limitation, if first foot 130 is inserted into wide portion 62 and is then moved in a transverse direction T (e.g., inward), first portion 132 may slide into narrow portion 64 until second portion 134 contacts narrow portion 64/the end of wide portion 62. Narrow portion 64 may be configured such that third portion 136 may slide under narrow portion 64 (e.g., a thickness of narrow portion 64 may be about the same as or less than a height 132B of first portion 132). For example, and without limitation, sliding body 102 in transverse direction T may include sliding at least some of third portion 136 under narrow portion 64. Disposing third portion 136 under narrow portion 64 may restrict vertical movement of first foot 130 and/or body 102 relative to movable track 50. A width 64A of narrow portion 64 may correspond to a width 132A of first portion 132. For example, and without limitation, narrow portion width 64A may be about the same as, less than, or larger than first portion width 132A. In embodiments, first portion 132 and narrow portion 64 may be configured for an interference/press fit. Disposing third portion 136 under narrow portion 64 may include disposing portions of movable track 50 within recesses 138A, 138B.

With embodiments, movable track 50 may include a second aperture 70 that may be configured substantially the same as first aperture 60 and/or may include a wide portion 72 and/or a narrow portion 74. First aperture 60 and/or second aperture 70 may be disposed in a top 54 of movable track 50. First aperture 60 and/or second aperture 70 may be substantially centered (e.g., when view along a longitudinal direction L) in top 54.

In embodiments, third foot 150 may include a first portion 152 and/or a second portion 154. First portion 152 and/or second portion 154 may be generally rectangular. First portion 152 may extend outward and generally perpendicularly to bottom surface 110 of body 102. Second portion 154 may extend generally perpendicularly from an end of first portion 152 and/or generally parallel to bottom surface 110 of body 102. A width 160A of second portion 160 (e.g., measured in longitudinal direction L) may be less than a width 152A of first portion 152. Second portion 160 may or may not be centered on first portion 152. For example, and without limitation, second portion 160 may be offset to one side of first portion 152 such that second portion 160 is aligned with an inner edge 156 or outer edge 158 of first portion 152. Fourth foot 180 may be configured similar to and/or the same as third foot 150. Fourth foot 180 may include a first portion 182 that may extend generally perpendicularly from bottom surface 110 of body 102. Fourth foot 180 may include a second portion 188 that may extend generally perpendicularly from first portion 182 and/or generally parallel to bottom surface 110. Second portion 188 may be centered on first portion 182 and/or second portion 188 may be aligned with an inner edge 184 and/or an outer edge 186 of first portion 182. In embodiments, third foot 150 and fourth foot 180 may be mirrored versions of each other (e.g., relative to transverse direction T). For example, and without limitation, second portion 160 of third foot 150 may be aligned with outer edge 158 of first portion 152 such that first portion 152 includes an inner open section 162, and second portion 188 of fourth foot 180 may be aligned with outer edge 186 of first portion 182 such that first portion 182 includes an inner open section 190.

In embodiments, third foot and fourth foot may extend from at or about an inner edge of bottom surface and/or may be disposed at distances from inner corners of bottom surface. Third foot 150 and fourth foot 180 may be aligned with each other in longitudinal direction L. Third foot 150 and fourth foot 180 may or may not be aligned with first foot 130 and second foot 140 in transverse direction T. Third foot 150 and fourth foot 180 may be offset from first foot 130 and second foot 140 in transverse direction T and/or longitudinal direction L. Third foot 150 and fourth foot 180 may be disposed between first foot 130 and second foot 140 when viewed along transverse direction T, and/or may be separated from first foot 130 and second foot 140 when viewed along longitudinal direction L.

With embodiments, a movable track 50, 50' may include a third aperture 80 and/or a fourth aperture 82. Third aperture 80 and/or fourth aperture 82 may be disposed in a vertical side 52 (e.g., an inner vertical side) of movable track 50 and/or may be configured to receive third foot 150 and fourth foot 180, respectively. For example, and without limitation, if first portions 132, 142 of first and second feet 130, 140 are disposed in wide portions 62, 72 and bearing 100 is moved outward in transverse direction T, first portions 132, 142 of first and second feet 130, 140 may slide into narrow portions 64, 74, and second portions 160, 188 of third and fourth feet 150, 180 may slide into third and fourth apertures 80, 82. Movement of bearing 100 in transverse direction T may continue until first portion 152 of third foot 150 and/or first portion 182 of fourth foot 180 contact movable track 50 (e.g., vertical side 52) and/or until second portion 134 of first foot 130 and/or second portion 144 of second foot 140 contact movable track 50. Disposing at least a portion of third foot 150 and/or fourth foot 180 in third aperture 80 and/or fourth aperture 82 may restrict vertical, longitudinal, and/or transverse movement of bearing 100 relative to movable track 50.

With embodiments, apertures of a movable track 50, 50' (e.g., apertures 60, 70) may include second narrow portions 64', 74'. First narrow portions 64, 74 and second narrow portions 64', 74' may be disposed on opposite sides of wide portions 62, 72. Second narrow portions 64', 74' may permit first and second feet 130, 140 of bearing 100 to be connected to a movable track 50, 50' in a plurality of orientations, such as in either inward or outward transverse directions. In embodiments, a movable track 50, 50' may include a fifth aperture 84 and/or a sixth aperture 86. Fifth and sixth apertures 84, 86 may be configured in generally the same manner as third and fourth apertures 80, 82 and may be disposed on an opposite side of movable track 50 (e.g., an outer vertical side 56) from third and fourth apertures 80, 82. Fifth and sixth apertures 84, 86 may permit third and fourth feet 150, 180 of bearing 100 to be connected to movable track 50, 50' in a plurality of orientations, such as in either inward or outward transverse directions (e.g., movable tracks 50, 50' may be reversible).

Including second narrow portions 64', 74' and/or fifth and sixth apertures 84, 86 may reduce assembly complexity. For example, and without limitation, including second narrow portions 64', 74' and/or fifth and sixth apertures 84, 86 may allow for all of the feet 130, 140, 150, 180 of bearing 100 to be inserted from either transverse direction, may permit movable tracks 50, 50' to be interchangeable/reversible, and/or may permit movable tracks 50, 50' to be connected to fixed tracks 40, 40' in at least two orientations.

First and second apertures 60, 70 may be aligned with each other such that, for example, wide portions 62, 72 are aligned (e.g., when viewed along a longitudinal direction L), first narrow portions 64, 74 are aligned, and/or second narrow portions 64', 74' are aligned. The centers of first and second apertures 60, 70 may be offset from the centers of third and fourth apertures 80, 82 and/or the centers of fifth and sixth apertures 84, 86), which may correspond to an offset of first and second feet 130, 140 relative to third and fourth feet 150, 180.

In embodiments, first foot 130, second foot 140, third foot 150, and/or fourth foot 180 may include one or more tapered portions $200_N$ (e.g., tapered portions $200_1, 200_2, 200_3, 200_4$) that may facilitate insertion of body 102 into a movable track 50, 50'.

In embodiments, such as generally illustrated in FIGS. 5A-6B, body 102 may include a retaining tab 210. Retaining tab 210 may be configured to restrict the movement of bearing 100 relative to a movable track 50, 50' (e.g., restrict movement inward in transverse direction T). Retaining tab 210 may extend downward from body 102 (e.g., toward movable track 50 in vertical direction V). Retaining tab 210 may be disposed between first foot 130 and second foot 140, and/or between third foot 150 and fourth foot 180 (e.g., when viewed along transverse direction T). Retaining tab 210 may be tapered such that it extends downward a greater amount closer to third and fourth feet 150, 180. If first foot 130 and/or second foot 140 is inserted into a movable track 50, 50', retaining tab 210 may initially contact a top 54 of movable track 50. If bearing 100 is moved such that first and second feet 130, 140 enter/engage narrow portions 64, 64', 74, 74' of apertures 60, 70 (e.g., moved in transverse direction T), retaining tab 210 may slide/snap into a retaining aperture 90. Once retaining tab 210 is disposed in retaining aperture 90, retaining tab 210 may restrict movement of bearing 100 relative to movable track 50 (e.g., inward transverse movement), which, in conjunction with engagement of first foot 130, second foot 140, third foot 150, and/or fourth foot 180, may restrict and/or prevent bearing 100 from being removed/disengaged from movable track 50.

With embodiments, retaining aperture 90 may, for example, be generally rectangular and/or square in shape and may be disposed in a top 54 of a movable track, 50 50'. In embodiments, movable track 50, 50' may include a pair of retaining apertures 90, 92 (e.g., disposed at opposite sides of movable track 50, 50') such that retaining tab 210 may retain bearing 100 relative to movable track 50, 50' regardless of which side of movable track 50, 50' bearing 100 is inserted/connected from.

With embodiments, retaining tab 210 may extend from a flexible protrusion 220 of bearing. Flexible protrusion 220 may be disposed at or about a bottom surface 110 of body 102 and/or may include at least a portion of bearing surface 106. Flexible protrusion 220 may be connected with body 102 at a first side 222, and may be disconnected/separated from body on at least one other side. For example, and without limitation, a second side 224, a third side 226, and a fourth side 228 of flexible protrusion 220 may not be in contact with the rest of body 102 (e.g., flexible protrusion may resemble a peninsula of body 102), which may facilitate flexing (e.g., bending, deflection, etc.) of flexible protrusion 220. Upon initial insertion of first and second feet 130, 140 into apertures 60, 70, flexible protrusion 220 (and retaining tab 210) may deflect upward, which may facilitate full insertion of first and second feet 130, 140 into apertures 60, 70. As body 102 is moved in transverse direction T, retaining tab 210 may align with retaining aperture 90, 92, which may permit flexible protrusion 220 to deflect down and/or retaining tab 210 to enter/engage retaining aperture 90, 92.

In embodiments, movable track 50, 50' may be symmetrical relative to its longitudinal axis and/or may be symmetrical about a transverse axis aligned with the center of retaining apertures 90, 92.

In embodiments, such as generally illustrated in FIG. 6A, body 102 may include one or more recesses 240A, 240B. Recesses 240A, 240B may be formed in a back side 122 of body 102 (e.g., opposite of an opening 124 of cross member receiving portion 104) and/or may be disposed at opposite sides of cross member receiving portion (e.g., at a longitudinal front and rear). Recesses 240A, 240B may be configured to reduce the amount of material and/or weight of bearing 100.

In embodiments, movable track 50' may be configured in the same or similar manner as movable track 50.

Figure 7:
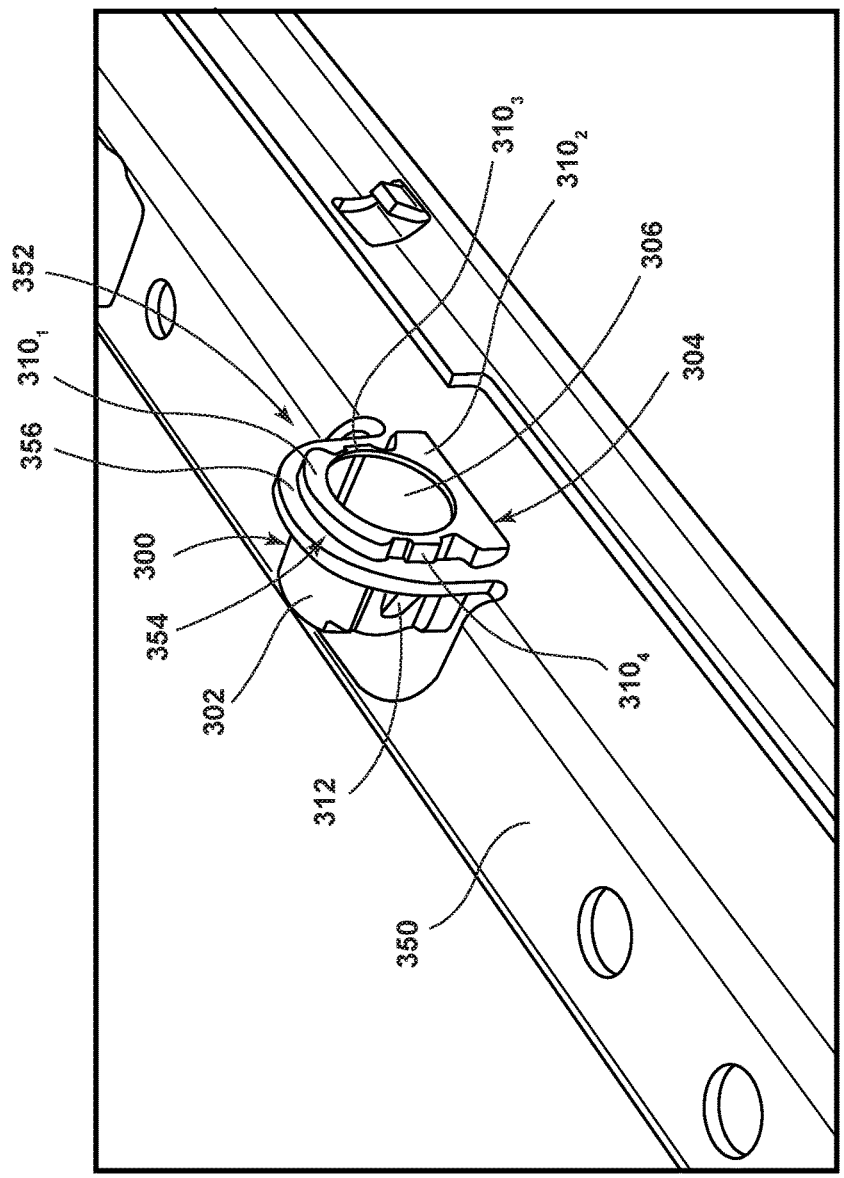
FIG. 7 is a perspective view generally illustrating portions of a seat track assembly in accordance with embodiments of the present disclosure.

In embodiments, such as generally illustrated in FIG. 7, a bearing 300 may include a body 302, which may include a cross member receiving portion 304. Cross member receiving portion 304 may be configured to receive at least a portion of a cross member (e.g., cross member 46) and/or may be configured to support cross member 46 for rotation. For example, cross member receiving portion 304 may include a bearing surface 306 upon which cross member 46 may be configured to rotate. Cross member receiving portion 304 may, for example, include a generally cylindrical configuration and/or bearing surface 306 may be provided at an inner diameter of cross member receiving portion 304.

With embodiments, body 302 may be configured for connection with a movable track 350. Movable track 350 may include a bearing retaining feature 352, such as, for example, an aperture 354 that may be configured to receive at least a portion of bearing 300. Aperture 354 may be formed via a projection 356 that may extend generally vertically from movable track 350. Projection 356 may extend substantially above a top of movable track 350 and/or may include a generally upside down U-shape. In embodiments, projection 356 may be punched into movable track 350 and bent away from movable track 350 and/or a remainder of movable track 350 may be bent away from projection 356.

Body 302 may include one or more retaining elements. For example, and without limitation, body may include one or more flanges $310_N$ (e.g., flanges $310_1$, $310_2$, $310_3$, $310_4$). Flanges $310_N$ may be configured to limit the insertion depth of body 302 into aperture 354. Body 302 may include one or more protrusions 312 that may extend outward from body 302 and may increase in height (e.g., increase an outer width of body 302) toward flanges $310_N$. Shorter portions of protrusion 312 may be configured to facilitate easier initial insertion of body 302 into aperture 354. As insertion of body 302 into aperture 354 continues, protrusion 312 may come into contact with projection 356 such that body 302 is press fit and/or interference fit in aperture 354.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "embodiments," "one embodiment," or "an embodiment," or the like, means that a particular feature, structure, or characteristic described in connection with the embodiment is included in at least one embodiment. Thus, appearances of the phrases "in various embodiments," "in embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It should be understood that references to a single element are not so limited and may include one or more of such element. All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure.

What is claimed is:

1. A seat track assembly, comprising:
    a first seat track;
    a second seat track configured to slide relative to the first seat track;
    a cross member; and
    a bearing connecting the cross member to the second seat track, the bearing including a plurality of feet engaged with a plurality of apertures of the second seat track;
    wherein a first aperture of the plurality of apertures is disposed in a top side of the second seat track and a second aperture of the plurality of apertures is disposed in a lateral side of the second seat track; and the bearing is configured to be inserted into the first aperture and then moved into the second aperture.

2. The seat track assembly of claim 1, wherein the plurality of feet includes a first foot, a second foot, a third foot, and a fourth foot.

3. The seat track assembly of claim 2, wherein the first foot includes a first portion, a second portion, and a third portion; the first portion is disposed substantially perpendicularly to a bottom of a body of the bearing; the second portion is disposed substantially perpendicularly to the bottom of the body; the first portion and the second portion are disposed substantially perpendicularly to each other; the third portion is disposed at ends of the first portion and the second portion; the third portion is disposed substantially parallel to the bottom of the body; and the third foot and the fourth foot are substantially L-shaped.

4. The seat track assembly of claim 1, wherein the bearing includes a retaining tab engaged with a retaining aperture of the second seat track; and the retaining aperture is separate and distinct from the plurality of apertures.

5. The seat track assembly of claim 2, wherein the plurality of apertures includes a third aperture disposed in the top side of the second seat track, and a fourth aperture disposed in the lateral side of the second seat track.

6. The seat track assembly of claim 5, wherein the first foot and the second foot are configured to engage the first aperture and the second aperture, and are disposed in parallel to a longitudinal direction of the first seat track.

7. The seat track assembly of claim 6, wherein the third foot and the fourth foot are configured to engage the third aperture and the fourth aperture, and are disposed parallel to the longitudinal direction of the first seat track and offset from the first foot and the second foot.

8. The seat track assembly of claim 1, further comprising a third seat track, a fourth seat track configured to slide relative to the third seat track, a second bracket connecting the cross member to the fourth seat track, the second bracket including a plurality of feet engaged with a plurality of apertures of the fourth seat track.

9. The seat track assembly of claim 1, wherein the bearing comprises plastic.

10. The seat track assembly of claim 9, wherein the bearing is a single integrated component.

11. A bearing, comprising:
    a body comprising:
        a cross member receiving portion including a bearing surface configured to facilitate rotation of a cross member; and
        a plurality of feet configured to engage apertures of a movable track;
    wherein the cross member receiving portion and the plurality of feet are formed as a single, unitary component; a foot of the plurality of feet is configured for insertion into a first side of said movable track from a first direction; and another foot of the plurality of feet is configured for insertion into a second side of said movable track from a second direction that is substantially perpendicular to the first direction.

12. The bearing of claim 11, wherein the plurality of feet includes a a first additional foot and a second additional foot.

13. The bearing of claim 12, wherein the foot and the first additional foot are substantially identical.

14. The bearing of claim 13, wherein the another foot and the second additional foot include a different shape than the foot and the first additional foot.

15. The bearing of claim 13, wherein the foot includes a first portion, a second portion, and a third portion, wherein the first portion is disposed substantially perpendicularly to a bottom of the body, the second portion is disposed substantially perpendicularly to the bottom of the body, and the first portion and the second portion are disposed substantially perpendicularly to each other.

16. The bearing of claim 15, wherein the third portion is disposed at ends of the first portion and the second portion, and the third portion is disposed substantially parallel to the bottom of the body.

17. The bearing of claim 16, wherein the another foot and the second additional foot are substantially L-shaped.

18. The bearing of claim 14, further comprising a retaining tab configured to engage a tab aperture of said first side of said movable track; wherein the retaining tab extends substantially in a lateral direction of said movable track.

* * * * *